United States Patent
Baik et al.

[11] Patent Number: 5,268,627
[45] Date of Patent: Dec. 7, 1993

[54] START ASSISTING DEVICE FOR HIGH SPEED RELUCTANCE MOTOR

[75] Inventors: In C. Baik, Sungnam; Jun Y. Lim, Seoul, both of Rep. of Korea

[73] Assignee: Goldstar Co., Ltd., Seoul, Rep. of Korea

[21] Appl. No.: 14,921

[22] Filed: Feb. 8, 1993

[30] Foreign Application Priority Data

Feb. 11, 1992 [KR] Rep. of Korea ............... 1936/1992
Jul. 22, 1992 [KR] Rep. of Korea ............. 13095/1992

[51] Int. Cl.$^5$ .............................................. H02P 5/40
[52] U.S. Cl. .................................... 318/778; 318/701; 318/721; 318/798; 318/723
[58] Field of Search .............. 318/685, 696, 778, 254, 318/798, 653, 723, 138, 815, 701, 796, 721, 801, 724, 607, 638, 799, 661, 811; 363/17, 98, 90, 91, 79, 165; 310/156, 184, 163, 186

[56] References Cited

U.S. PATENT DOCUMENTS

| | | | |
|---|---|---|---|
| 3,875,487 | 4/1975 | White | 318/485 |
| 4,558,265 | 12/1985 | Hayashida et al. | 318/561 |
| 4,563,620 | 1/1986 | Komatsu | 318/138 |
| 4,565,957 | 1/1986 | Gary et al. | 318/723 |
| 4,835,448 | 5/1989 | Dishner et al. | 318/254 |
| 4,864,211 | 9/1989 | Kawaguchi | 318/626 |
| 5,148,089 | 9/1992 | Adachi et al. | 318/66 |
| 5,196,775 | 3/1993 | Harris et al. | 318/638 |
| 5,198,733 | 3/1993 | Wright | 318/254 |

FOREIGN PATENT DOCUMENTS

0108732 5/1984 European Pat. Off. .
0189675 6/1986 European Pat. Off. .
0481933 4/1992 European Pat. Off. .

OTHER PUBLICATIONS

Patent Abstracts of JP vol. 12, #476 (E-693)(3323) Dec. 13, 1988 & JP A63194587 (Matsushita Seiko Co. Ltd.) Nov. 08, 1988.
Patent Abstracts of JP vol. 13, No. 295 (E-783)(3643) Jul. 07, 1989 & JP-A-17 4 090 (Hitachi Ltd) Mar. 20, 1989.
Patent Abstracts of JP vol. 14, No. 312 (E-948)(4255) May 7, 1990 & JP-A-21 01 989 (Nippon Densan Corp) Apr. 13, 1990.
Patent Abstracts of JP vol. 10, No. 376 (E-464) (2433) Dec. 13, 1986 & JP-A-61 167 388 (NEC Corp) Jul. 29, 1986.

*Primary Examiner*—Paul Ip

[57] ABSTRACT

A start assisting device for a high speed reluctance motor, capable of starting the motor at a specific start disabling position where a static torque with a very small angle is present due to a phase advance. When the motor can not be started at a specific position, clock signals are supplied as gate drive signals, in place of drive signals based on a motor position detection. After starting the motor, the drive signals based on the position detection is supplied as gate drive signals, so as to drive normally the motor. Otherwise, when the motor can not be started, the drive signals based on the position detection is supplied as gate drive signals for different phases, so as to start the motor. After starting the motor, the drive signals based on the position detection are supplied as gate drive signals for corresponding phases, so as to drive normally the motor.

10 Claims, 7 Drawing Sheets

FIG.5A
PRIOR ART a PHASE

FIG.5B
PRIOR ART b PHASE

FIG.5C
PRIOR ART c PHASE

START ASSISTING DEVICE FOR HIGH SPEED RELUCTANCE MOTOR

BACKGROUND OF THE INVENTION

1. Field of the Invention

The present invention relates to a high speed reluctance motor, and more particularly to a start assisting device for a high speed reluctance motor, capable of starting the motor at a specific start disabling position where a static torque with a very small angle is present due to a phase advance.

2. Description of the Prior Art

Figure 1:
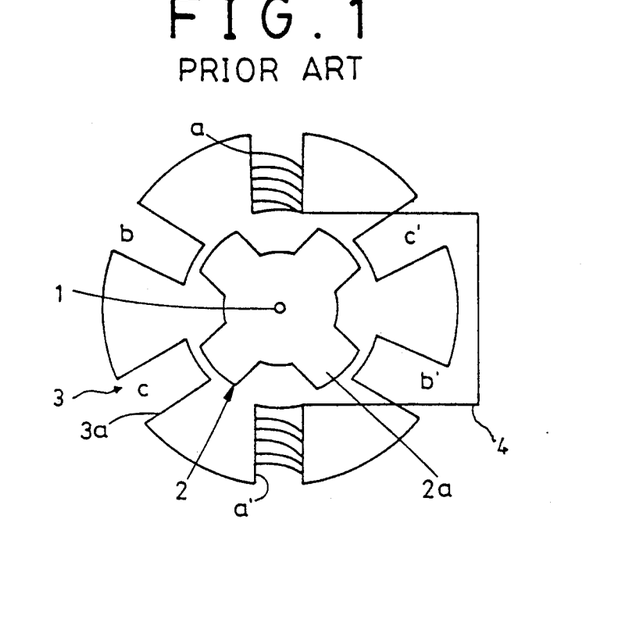
FIG. 1 is a schematic sectional view of a conventional three-phase reluctance motor, illustrating a stator and a rotor.

FIG. 1 is a schematic sectional view of a conventional three-phase reluctance motor with a stator and a rotor. As shown in FIG. 1, the reluctance motor comprises a stator 3 including six fixed magnetic poles 3a mounted to a motor housing and spaced uniformly from one another at 60° and coils 4 wound around one of pairs of opposed fixed magnetic poles 3a to form magnetic poles with reversed polarity. With this arrangement, the pairs of opposed magnetic poles have different phases a, b and c, respectively. The reluctance motor also comprises a rotor 2 disposed inwardly of the stator 3 to be rotatable about a rotating shaft 1 and provided with four rotating magnetic poles 4a space uniformly from one another at 90°.

In such a conventional reluctance motor, a rotor position detecting device (not shown) is also provided to detect the position of rotor 2. Based on the detected position of rotor 2, electric power is sequentially applied to coils 4 wound around the fixed poles 3a and provided with phases a, b and c, to drive the motor.

Figure 2:
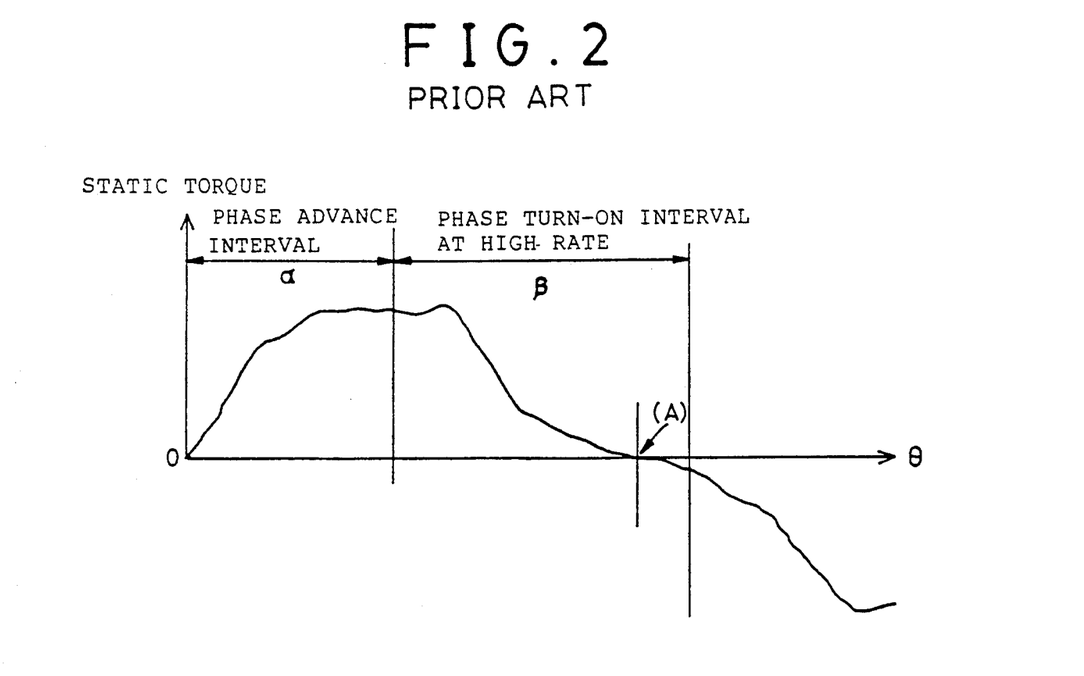
FIG. 2 is a characteristic curve illustrating a static torque depending on a variation in angle of the rotor shown in FIG. 1.

In the reluctance motor, a phase advance of $\alpha$ occurs at an interval $\beta$ where an optional phase is turned on during the rotation of reluctance motor at a high rate, that is, a magnetic force is generated from magnetic poles 3a with a required phase, due to a time taken until current applied to coils 4 reaches a normal state, as apparent from a static torque curve shown in FIG. 2.

The angle $\alpha$ is larger at a higher inductance of the coils and a higher speed of the motor. When the angle $\alpha$ exceeds a certain level, the interval $\beta$ involves a point of time at which the static torque is zero, that is, a point A in FIG. 2.

Figure 3:
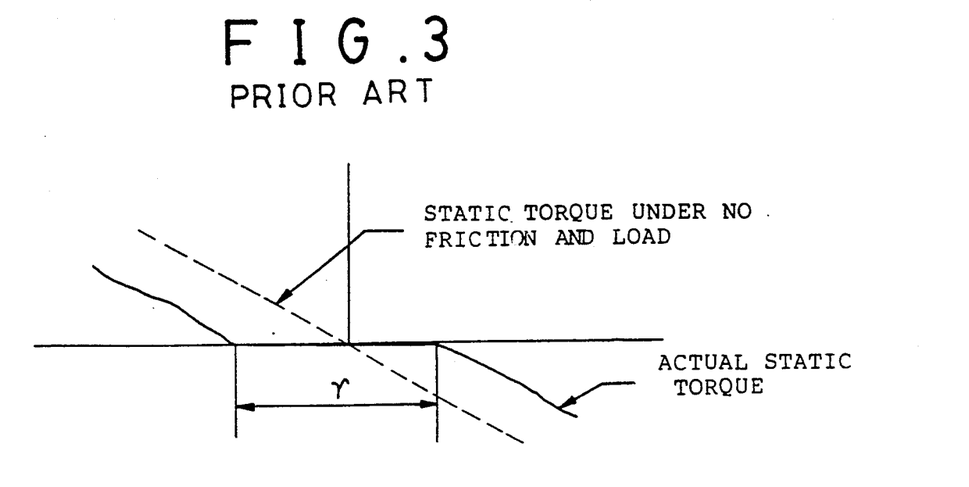
FIG. 3 is an enlarged view of FIG. 2, illustrating the static torque characteristic at a zero torque position, depending on friction and load.

The point A of FIG. 2 at which the static torque is zero is present in the form of an interval other than a point form, as shown in FIG. 3, due to friction and load conditions of the motor.

There is few problem in starting the motor, when the total interval $(\alpha + \beta)$ does not exceed the point A. However, when the total interval $(\alpha + \beta)$ exceeds the point A, the motor may be stopped at a position where a torque generated by driving an optional phase, that is, at the point A, so that the motor can not be started.

For example, if a phase to be driven for starting the motor is the phase a-a' under a condition that the rotor 2 has been stopped such that the rotating magnetic poles 4a of rotor 2 has been symmetrically positioned with respect to fixed magnetic poles with the phase a-a', as shown in FIG. 1, a rotation force can not be generated since the rotating magnetic poles of rotors 2 and the fixed magnetic poles are positioned symmetrically in all directions, even though the phase a-a' is driven. As a result, an initial start of the motor can not be accomplished.

Figure 4:
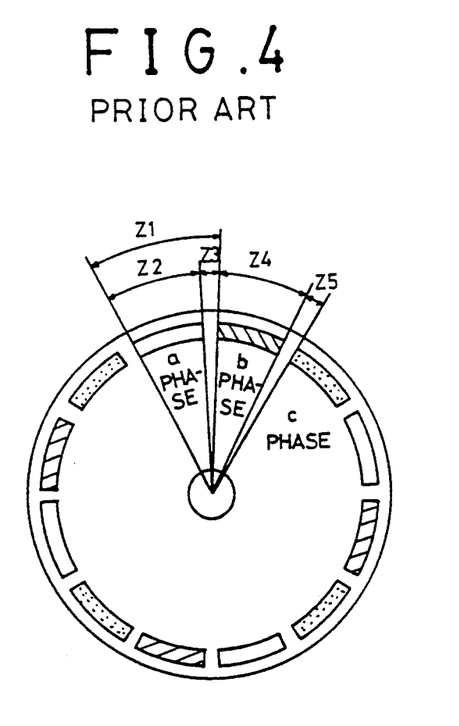
FIG. 4 is a schematic view illustrating position detection characteristics for various phases when conduction angles are smaller than a step angel in the conventional reluctance motor.
Figure 5A:
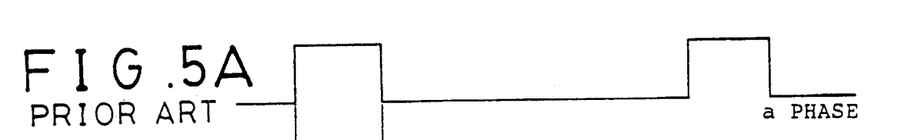
FIGS. 5A to 5C are waveform diagrams of drive signals for respective phases according to FIG. 4.
Figure 5B:
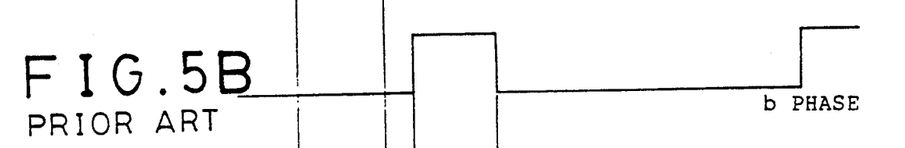
Figure 5C:
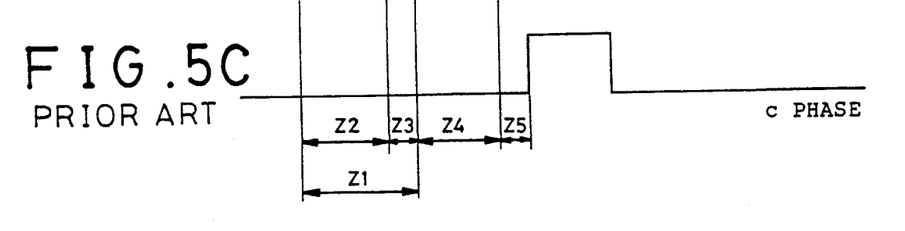

On the other hand, where conduction angles Z2 and Z4 are smaller than a step angle Z1, for the purpose of improving the efficiency of motor, as shown in FIG. 4, any phase can not be driven at positions corresponding the angles Z3 and Z5. When the motor is stopped at such positions, its start can not be accomplished. That is, any drive signal for initially driving the motor can not be generated when the motor has been stopped at the positions corresponding to the angles Z3 and Z5, since drive signals for the phases of motor (the phases a, b and c, in the illustrated three-phase motor) are intermittently generated with certain intervals corresponding to the angles Z3 and Z5.

In the conventional reluctance motor, a drive signal for each phase is generated only by a detecting signal for the rotor. Accordingly, there is a problem that the start of motor can not be accomplished at the above-mentioned specific positions, when the phase advance interval is increased due to a high speed of motor or a high inductance of coils 4 or when the conduction angle is smaller than the step angle for the purpose of improving the efficiency of motor. As a result, the design of motors is restricted by the phase advance angle and conduction angle, thereby causing the speed and efficiency of high speed reluctance motors to be degraded.

SUMMARY OF THE INVENTION

Therefore, an object of the invention is to eliminate the above-mentioned problems encountered in the prior arts and to provide a start assisting device for a high speed reluctance motor, capable of obtaining a rotation force by driving alternatingly respective phases irrespective of detection of rotor position and thus normally driving the motor according to the detection of rotor position.

In accordance with one aspect, the present invention provides a start assisting device for a high speed reluctance motor comprising: position detecting means for detecting the position of a rotor and generating drive signals for respective phases; stop discriminating means for scanning at least one of the phase drive signals and discriminating whether the motor is at its drive state or its stop state; start drive signal generating means for outputting a clock signal with a predetermined frequency generated from a clock generator as start drive signals for respective phases; drive signal selecting means for logically combining the start drive signals with the phase drive signals from the position detecting means, by phases, based on a control signal from the stop discriminating means, so as to select the start drive signals upon starting the motor and to select the drive signals from the position detecting means after starting the motor, and outputting the selected drive signals as gate drive signals for respective phases; and driving means for conducting coils for respective phases according to the gate drive signals from the drive signal selecting means.

In accordance with another aspect, the present invention provides a start assisting device for a high speed reluctance motor comprising: position detecting means for detecting the position of a rotor and generating drive signals for respective phases; stop discriminating means for scanning at least one of the phase drive signals and discriminating whether the motor is at its drive state or its stop state; start drive control means for outputting a clock signal of a predetermined frequency generated from a clock generator as start control signal at the stop state of motor, according to a control signal from the stop discriminating means; drive signal selecting means for selecting the phase drive signals from the position detecting means as gate drive signals for different phases and outputting them at the stop state of motor and selecting the phase drive signals from the position detecting means as gate drive signals for corresponding phases and outputting them at the drive state of motor; and driving means for exciting coils for respective phases according to the gate drive signals from the drive signal selecting means and driving the motor.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 6:
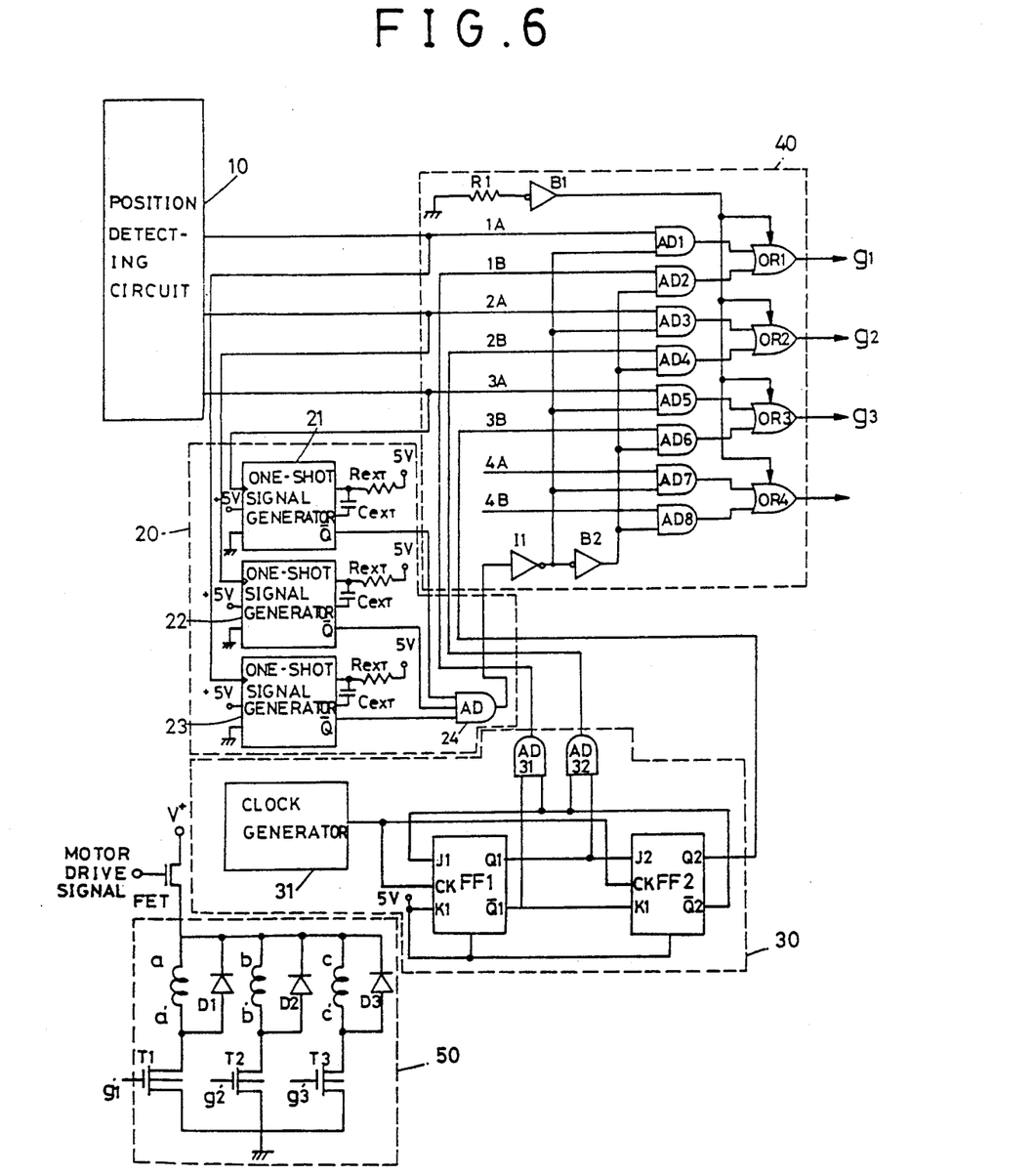
FIG. 6 is a circuit diagram of a start assisting device for a high speed reluctance motor in accordance with an embodiment of the present invention.

Referring to FIG. 6, there is illustrated a start assisting device for a high speed reluctance motor in accordance with an embodiment of the present invention.

The start assisting device comprises a position detecting circuit 10 for detecting the position of a rotor and generating drive signals 1A, 2A and 3A for respective phases, a stop discriminating circuit 20 for scanning at least one of the phase drive signals 1A, 2A and 3A and discriminating whether the motor is at its drive state or its stop state, and a start drive signal generating circuit 30 for outputting clock signals with predetermined frequencies generated from a clock generator 31 as start drive signals 1B, 2B and 3B for respective phases. The start assisting device also comprises a drive signal selecting circuit 40. The drive signal selecting circuit 40 serves to logically combine the start drive signals 1B, 2B and 3B with the phase drive signals 1A, 2A and 3A from the position detecting circuit 10, by phases, based on a control signal from the stop discriminating circuit 20, so as to select the start drive signals 1B, 2B and 3B upon starting the motor and the drive signals 1A, 2A and 3A from the position detecting circuit 10 after starting the motor. The drive signal selecting circuit 40 outputs the selected drive signals as gate drive signals g1, g2 and g3 for respective phases. A driving circuit 50 is also provided for conducting coils a-a', b-b' and c-c' for respective phases according to the gate drive signals g1, g2 and g3.

In accordance with the present invention, the stop discriminating circuit 20 comprises a plurality of one-shot signal generators 21, 22 and 23 adapted to be triggered by drive signals 1A, 2A and 3A from the position detecting circuit 10 and generate pulse signals which are maintained for a predetermined time and a logic gate 24 for logically combining output signals from the one-shot signal generators 21, 22 and 23 and generate different logic signals at the stop state of the motor and the drive state of the motor.

As the one-shot signal generators 21, 22 and 23, three monostable multivibrators are used which are adapted to be triggered by the drive signals 1A, 2A and 3A from the position detecting circuit 10 and output high level signals for predetermined time constants, respectively. As the logic gate 24, an AND gate AD is used which is adapted to AND-combine inverted output signals from the monostable multivibrators.

Although three one-shot signal generators 21, 22 and 23 which are triggered by the drive signals 1A, 2A and 3A for respective phases are used in the embodiment illustrated in FIG. 6, only two one-shot signal generators may be used for discriminating the drive state/stop state of the motor, based on drive signals for two phases. Otherwise, only a single one-shot signal generator may be also used for discriminating the drive state/stop state of the motor, based on a drive signals for a single phase. In all cases mentioned above, when the motor is at its drive state, the time constant is predetermined for always making the output level of the logic gate 24 constant (for example, a low level signal).

On the other hand, the start drive signal generating circuit 30 comprises the clock generator 31 for generating a clock signal with a predetermined frequency, a front flip-flops FF1 having a clock terminal CK for receiving an output signal from the clock generator 31, a rear flip-flop FF2 having a clock terminal CK for receiving the output signal from the clock generator 31 and adapted to receive a non-inverted output signal Q1 and an inverted output signal /Q1 from the clock generator 31 as a J input signal J2 and a K input signal K2, respectively, feed back its inverted output signal /Q2 as a J input signal J1 of the from flip-flop FF1 and output a non-inverting output signal Q2 as a start drive signal 3B of the third phase c-c', an AND gate AD31 for AND-combining the inverted output signals /Q1 and /Q2 from the front and rear flip-flops FF1 and FF2 and output the resultant signal as the start drive signal 1B for the first phase a-a', and an AND gate AD32 for AND-combining the inverted output signals /Q1 from the front flip-flop FF1 and the non-inverted output signal Q2 from the rear flip-flop FF2 and output the resultant signal as the start drive signal 2B for the second phase b-b'.

The drive signal selecting circuit 40 comprises a plurality of first AND gates AD1, AD3 and AD5 for AND-combining a first select signal obtained by inverting the control signal from the stop discriminating circuit 30 through an inverter gate I1 with drive signals 1A, 2A and 3A from the position detecting circuit 10, respectively, a plurality of second AND gates AD2, AD4 and AD6 for AND-combining a second select signal obtained by buffering the inverted first select signal from the inverter gate I1 through a buffer B2 with drive signals 1B, 2B and 3B from the start drive signal generating circuit 30, and a plurality of OR gates OR1, OR2 and OR3 for OR-combining output signals from respective of pairs of the first and second AND gates AD1-AD2, AD3-AD4 and AD5-AD6 by phases and outputting gate drive signals g1, g2 and g3 for respective phases. The OR gates OR1, OR2 and OR3 are constructed such that its enable/disable states are controlled by the output control signals.

Now, operation of the start assisting device with the above-mentioned construction according to the present invention will be described.

First, the rotated position of the rotor is detected by rotor position detecting sensors (not shown) of the position detecting circuit 10. Position detecting signals based on the rotor position detection are outputted as drive signals 1A, 2A and 3A for respective phases, by a proper logic combination carried out in the position detecting circuit 10.

The drive signals 1A, 2A and 3A are sent, as trigger signals, to one-shot signal generators 21, 22 and 23 of the stop discriminating circuit 20. Inverted output signals /Q from the one-shot signal generators 21, 22 and 23 are AND-combined together in the logic gate 24.

When the motor is at its drive state that the rotor rotates, the one-shot signal generators 21, 22 and 23 are sequentially triggered, in that drive signals 1A, 2A and 3A for respective phases are sequentially outputted. Accordingly, the one-shot signal generators 21, 22 and 23 output inverted output signals /Q for their time constants as low level signals, respectively. The inverted output signals from the one-shot signal generators 21, 22 and 23 are AND-combined in the logic gate 24, so that the stop discriminating circuit 20 outputs a low level signal.

On the other hand, when the motor is at its stop state, the position detecting circuit 10 does not output the drive signals 1A, 2A and 3A. Accordingly, no trigger signal is applied to the one-shot signal generators 21, 22 and 23 which, in turn, output high level signals as their inverted output signals /Q. As a result, the logic gate 24 outputs a high level signal.

In the start drive signal generating circuit 30, clock signals with a predetermined frequency are generated from the clock generator 31. The clock signals are then sequentially outputted pulse by pulse, as start drive signals 1B, 2B and 3B, by the operations of the two JK flip-flops FF1 and FF2 and two AND gates AD31 and AD 32.

When the motor is at its drive state, the drive signal selecting circuit 40 selects the drive signals 1A, 2A and 3A from the position detecting circuit 10 and outputs them as their gate drive signals g1, g2 and g3, based on a control signal from the stop discriminating circuit 30. When the motor is at its stop state, the drive signal selecting circuit 40 selects the start drive signals 1B, 2B and 3B and outputs them as their gate drive signals g1, g2 and g3.

That is, at the stop state of motor (upon starting), the stop discriminating circuit 20 outputs a high level signal which is, in turn, inverted through the inverter gate I1 of the drive signal selecting circuit 40 and sent to all of the first AND gates AD1, AD3 and AD5, as their first control signals. Accordingly, the first AND gates AD1, AD3 and AD5 output low level signals irrespective of input signals at their other input terminals, so that outputting of drive signals 1A, 2A and 3A from the position detecting circuit 10 is shut off. On the other hand, the first control signals are inverted again and sent to the second AND gates AD2, AD4 and AD6 via the buffer B2, as second control signals with high level. Accordingly, the start drive signals 1B, 2B and 3B from the start drive signal generating circuit 30 are transmitted via the second AND gates AD2, AD4 and AD6 and then outputted via the OR gates OR1, OR2 and OR3, respectively.

Assuming that the motor is stepped at a specific position where the rotation torque obtained by driving the phase a-a' as mentioned above in conjunction with the prior art and that in this case, the drive signal generated upon starting the motor is the drive signal 1A for the phase a-a', starting of the motor can be smoothly accomplished in accordance with the present invention. At the same conditions, the prior art can not accomplish the starting of motor, as mentioned above.

That is, when the motor is started under a condition that it has been stopped at the above-mentioned specific position, the position detecting circuit 10 outputs the drive signal 1A for the phase a-a' which is, in turn, applied to the corresponding one-shot signal generator 1A as a trigger signal. By the trigger signal, the one-shot signal generator 21 is triggered and outputs a low level signal for a predetermined time constant. The low level signal from the one-shot signal generator 21 is then sent to the drive signal selecting circuit 40, via the logic gate 24. Thereafter, the low level signal from the stop discriminating circuit 20 is inverted through the inverter gate I1 and applied to the first AND gate AD1 as a high level signal. Accordingly, the drive signal 1A for the phase a-a' from the position detecting circuit 10 is applied to the driving circuit 50 as the gate drive signal g1 for the phase a-a'. However, the starting of motor can not be accomplished at this time, even though the phase a-a' is driven. This is because the motor has been stopped at the state that the rotation torque obtained by driving the phase a-a' is zero.

Thereafter, the position detecting circuit 10 outputs continuously the drive signal 1A with the high level. However, it can not trigger the one-shot signal generator 21 (this is because there is no edge by virtue of the unchanged drive signal 1A for the phase a-a'). As a result, the one-shot signal generator 21 can not be triggered again, so that its inverted output signal /Q is outputted as a high level signal when the time constant of the one-shot signal generator 21 has elapsed after the one-shot signal generator 21 was initially triggered. Accordingly, the logic gate 24 outputs a high level signal.

As the high level signal is outputted from the stop discriminating circuit 20 after the predetermined time constant, the second AND gates AD2, AD4 and AD6 of the drive signal selecting circuit 40 are activated so that the start drive signals 1B, 2B and 3B from the start drive signal generating circuit 30 are outputted as gate drive signals g1, g2 and g3. Accordingly, an initial driving can be accomplished by the start drive signal from the start drive signal generating circuit 30, where the starting of motor can not be accomplished by the drive signal from the position detecting circuit 10. In this case, all the phases are sequentially driven by the start signals generated from the start drive signal generating circuit 30. Accordingly, even though the starting of motor could not be accomplished upon driving the phase a-a', by virtue of the rotation torque of zero, it can be subsequently achieved as the phase b-b' is driven.

After the initial driving, drive signals for respective phases are sequentially generated, according to the rotor position detection carried out by the position detecting circuit 10. By the generated drive signals, the one-shot signal generators 21, 22 and 23 are sequentially triggered so that output signals therefrom are maintained for their time constants, respectively. Accordingly, the stop discriminating circuit 20 outputs a low level signal indicative of the rotation state of motor. Subsequently, the drive signal selecting circuit 40 selects the drive signals 1A, 2A and 3A from the position detecting circuit 10 according to the low level signal from the stop discriminating circuit 20 and outputs gate drive signals ga, g2 and g3. Thus, a normal driving of motor can be accomplished.

Figure 7:
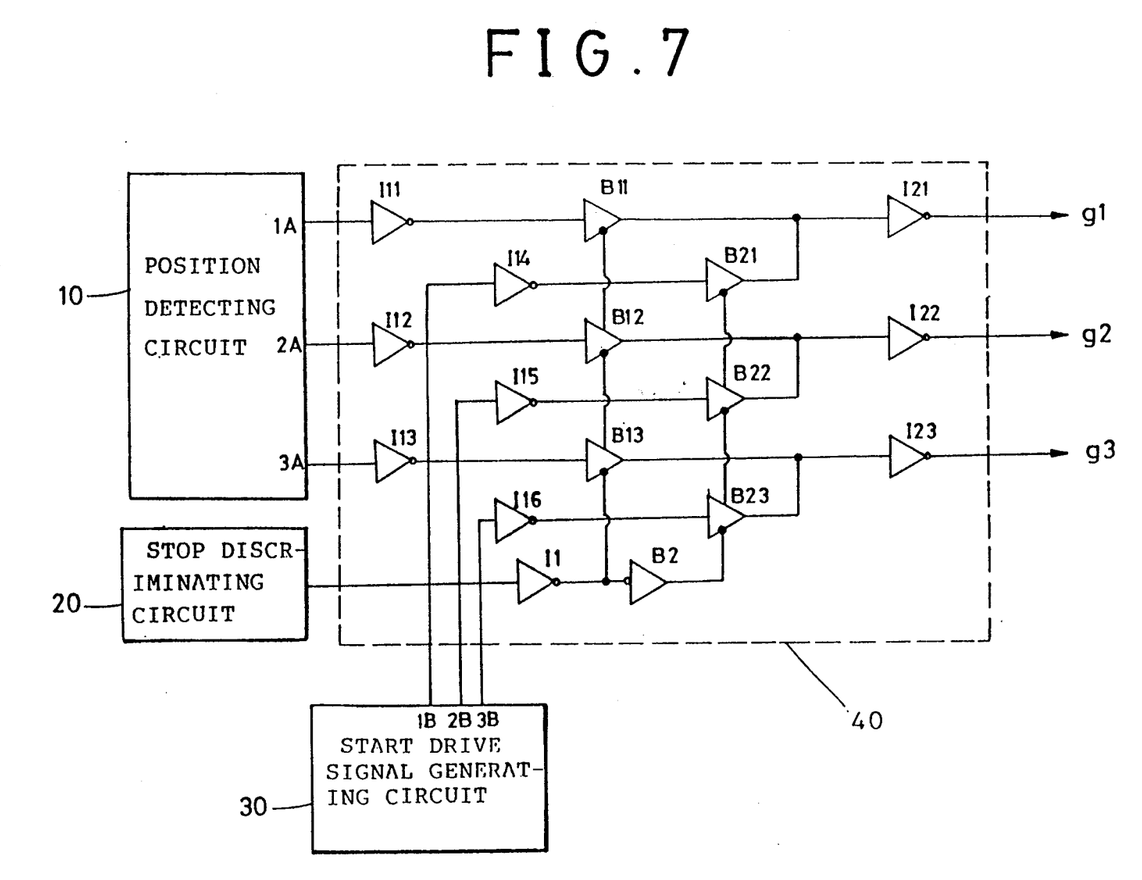
FIG. 7 is a circuit diagram of another embodiment of a drive signal selecting circuit shown in FIG. 6.

On the other hand, the drive signal selecting circuit 40 may have another construction, without being limited to the construction comprising the AND gates AD1 to AD6 and OR gates OR1 to OR3 as shown in FIG. 6. As shown in FIG. 7, the drive signal selecting circuit 40 may comprises a plurality of first inverter gates I11, I12, I13, I14, I15 and I16 for inverting the phase drive signals 1A, 2A and 3A outputted from the position detecting circuit 10 and the start drive signals 1B, 2B and 3B outputted from the start drive signal generating circuit 30, respectively, a first three-state buffers B11, B12 and B13 for passing the phase drive signals 1A, 2A and 3A from the position detecting circuit 10 through the first inverter gates I11, I12 and I13, according to a first select signal obtained by inverting the control signal of the stop discriminating circuit 20, respectively, a second three-state buffers B21, B22 and B23 for passing the phase drive signals 1B, 2B and 3B from the start drive signal generating circuit 30 through the first inverter gates I14, I15 and I16, according to a second select signal obtained by inverting the first select signal, respectively, and a plurality of second inverter gates I21, I22 and I23 for receiving output signals from the first three-state buffers B11, B12 and B13 and the second three-state buffers B21, B22 and B23 in common by phases and inverting them to output gate drive signals ga, g2 and g3 for respective phases.

In this construction shown in FIG. 7, when a high level signal is outputted from the stop discriminating circuit 20, based on the discrimination for the stop state of motor, it is inverted through the inverter gate I1 so that a first control signal is applied as a low level signal to control terminals of the first three-state buffers B11, B12 and B13. Accordingly, the first three-state buffers B11, B12 and B13 are turned off, thereby causing the drive signals 1A, 2A and 3A from the position detecting circuit 10 to be shut off. Also, the first control signal with a low level is inverted through the inverting input buffer B2 and then sent as the second control signal to the control terminals of the second three-state buffers B21, B22 and B23. Accordingly, the second three-state buffers B21, B22 and B23 are turned on, so that the start drive signals 1B, 2B and 3B from the start drive signal generating circuit 30 can be sent to the second inverter gates I21, I22 and I23 and then outputted as gate drive signals g1, g2 and g3.

On the other hand, when a low level signal is outputted from the stop discriminating circuit 20, based on the discrimination for the drive state of motor, the second three-state buffers B21, B22 and B23 are turned off, thereby causing the start drive signals 1B, 2B and 3B from the start drive signal generating circuit 30 to be shut off. Also, the first three-state buffers B11, B12 and B13 are turned on, so that the phase drive signals 1A, 2A and 3A from the position detecting circuit 10 are selected and outputted as gate drive signals g1, g2 and g3.

Figure 8:
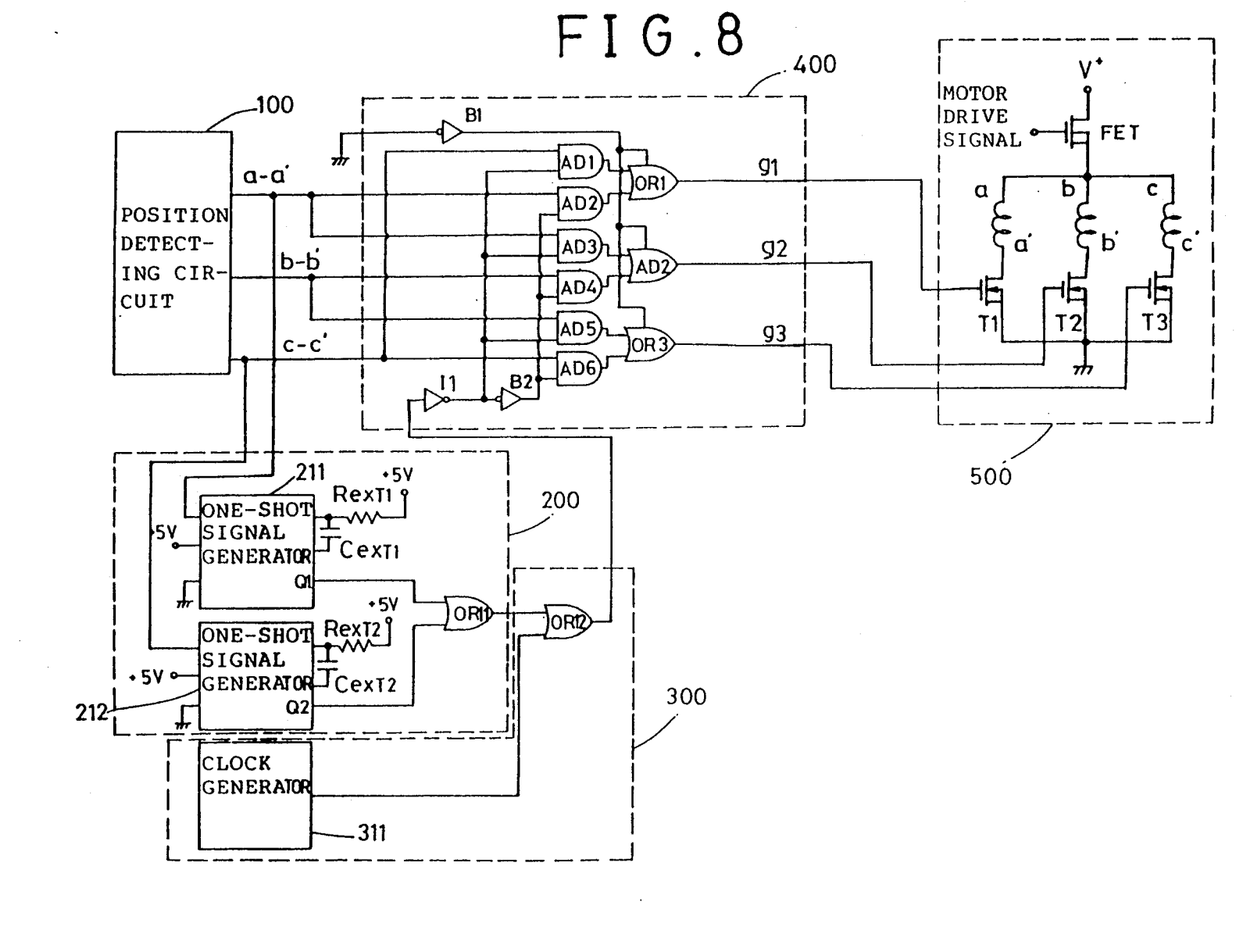
FIG. 8 is a circuit diagram of a start assisting device for a high speed reluctance motor in accordance with another embodiment of the present invention.

FIG. 8 shows a start assisting device according to another embodiment of the present invention. As shown in FIG. 8, the start assisting device comprises a position detecting circuit 100 for detecting the position of a rotor and generating drive signals for respective phases, a stop discriminating circuit 200 for scanning at least one of the phase drive signals and discriminating whether the motor is at its drive state or its stop state, a start drive control circuit 300 for outputting a clock signal of a predetermined frequency generated from a clock generator 311 as start control signal at the stop state of motor, according to a control signal from the stop discriminating circuit 200, a drive signal selecting circuit 400 for selecting the phase drive signals from the position detecting circuit 100 as gate drive signals g1, g2 and g3 for different phases and outputting them at the stop state of motor and selecting the phase drive signals from the position detecting circuit 100 as gate drive signals g1, g2 and g3 for corresponding phases and outputting them at the drive state of motor, and a driving circuit 500 for exciting coils a-a', b-b' and c-c' for respective phases according to the gate drive signals g1, g2 and g3 from the drive signal selecting circuit 400 and driving the motor.

The stop discriminating circuit 200 comprises two one-shot signal generators 211 and 212 adapted to be triggered by drive signals for two phases from the position detecting circuit 100 and generate stabilizing signals for a predetermined time constant and an OR gate OR11 for ORing non-inverted output signals from the one-shot signal generators 211 and 212.

On the other hand, the start drive signal generating circuit 300 comprises the clock generator 311 for generating a clock signal with a predetermined frequency and an OR gate OR12 for ORing an output signal from the clock generator 311 and an output signal from the stop discriminating circuit 200.

The drive signal selecting circuit 400 comprises a plurality of first AND gates AD1, AD3 and AD5 for AND-combining a first control signal obtained by inverting the output signal from the stop discriminating circuit 300 through an inverter gate I1 with drive signals for phases c-c', a-a' and b-b' from the position detecting circuit 100, respectively, a plurality of second AND gates AD2, AD4 and AD6 for AND-combining a second control signal obtained by buffering the inverted first control signal from the inverter gate I1 through an inverting input buffer B2 with drive signals for phases a-a', b-b' and c-c' from the start drive signal generating circuit 300, respectively, and a plurality of OR gates OR1, OR2 and OR3 for ORing output signals from respective of pairs of the first and second AND gates AD1-AD2, AD3-AD4 and AD5-AD6 and outputting gate drive signals g1, g2 and g3.

Operation of the start assisting device according to this embodiment will be described in brief.

When the motor can not rotate upon starting, the one-shot signal generators 211 and 212 can not be triggered, thereby causing the OR gate OR11 to output a low level signal. Accordingly, the clock signal from the clock generator 311 is sent to the drive signal selecting circuit 400 via the OR gate OR12.

In the drive signal selecting circuit 400, the first AND gates AD1, AD3 and AD5 and the second AND gates AD2, AD4 and AD6 output alternatingly the phase drive signals from the position detecting circuit 100 to the OR gates OR1, OR2 and OR3. At this time, the drive signals for the phases a-a', b-b' and c-c' are applied to the first AND gates AD3, AD5 and AD1 and the second AND gates AD1, AD3 and AD5, so that the drive signal for the initial phase a-a' can be applied as the gate drive signal g2 for the phase b-b' to the motor driving circuit 500, via the AND gate AD3 and the OR gate OR12. After starting the motor, the one-shot signal generators 211 and 212 of the stop discriminating circuit 200 are alternatingly triggered, so as to output high level signals for predetermined time constants, respectively. Accordingly, the OR gate OR11 always outputs a high level signal under a condition that the rotor of motor rotates. By the high level signal from the stop discriminating circuit 200, the OR gate OR12 outputs a high level signal, irrespective of the clock signal from the clock generator 311. When the high level signal is outputted from the OR gate OR12 during the rotation of motor, the first AND gates AD1, AD3 and AD5 of the drive signal selecting circuit 400 are at their disable state while the second AND gates AD2, AD4 and AD6 are at their enable state. As a result, the drive signals based on the rotor position detection of the position detecting circuit 100 are selected as gate drive signals for corresponding phases and outputted.

In the embodiment illustrated in FIG. 8, when the motor can not be started at a specific position, a drive signal for each phase from the position detecting circuit 100 is outputted as a gate drive signal for a different phase, so as to start the motor. As the motor is subsequently started, the drive signal for each phase from the position detecting circuit 100 is outputted as a gate drive signal for the corresponding phase. Thus, a normal driving can be accomplished.

Figure 9:
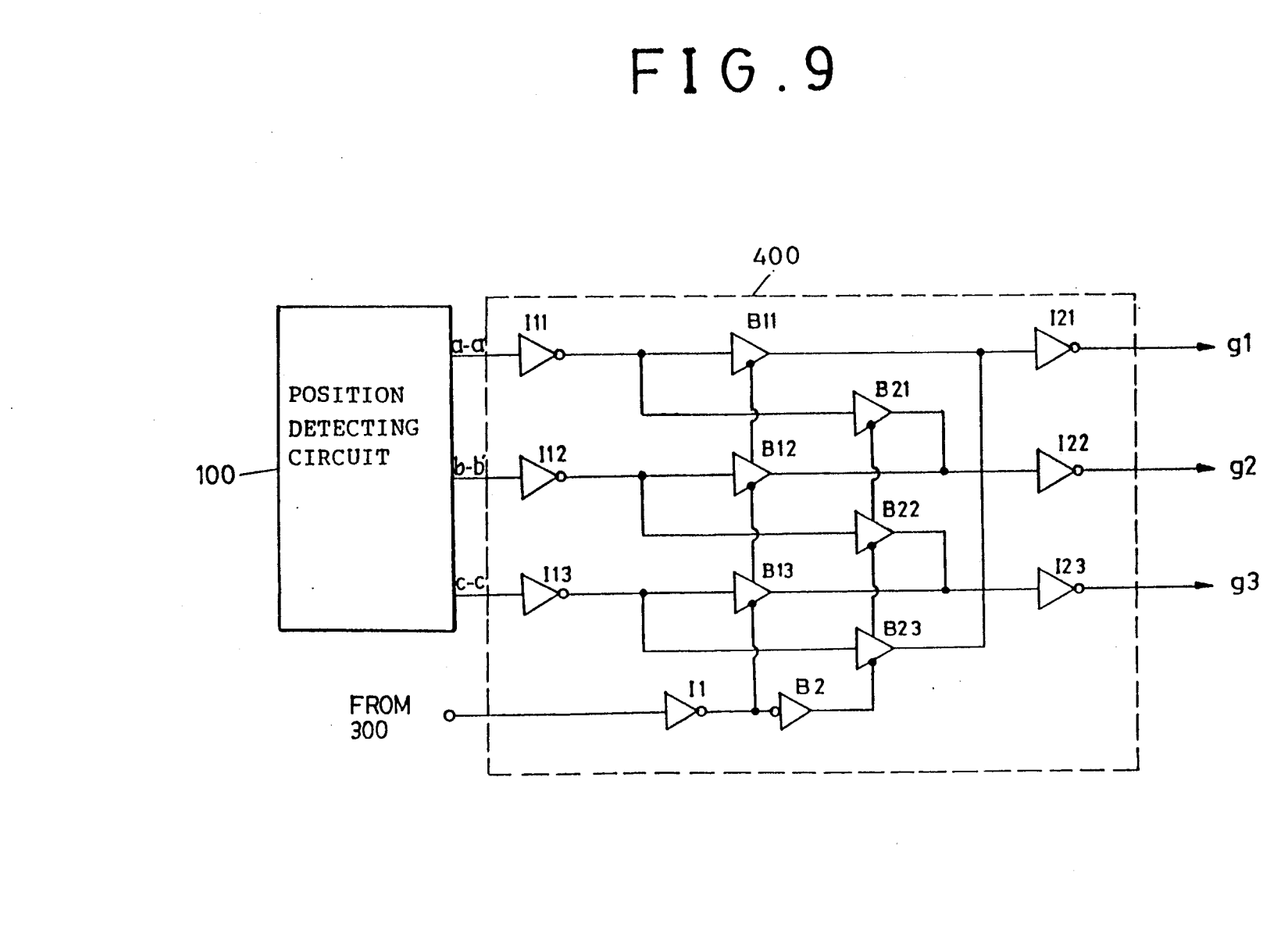
FIG. 9 is a circuit diagram of another embodiment of a drive signal selecting circuit shown in FIG. 8.

On the other hand, FIG. 9 illustrates another embodiment for the drive signal selecting circuit shown in FIG. 8. In this embodiment, the drive signal selecting circuit comprises a plurality of first inverter gates I11, I12 and I13 for inverting the phase drive signals outputted from the position detecting circuit 100, respectively, a plurality of first three-state buffers B11, B12 and B13 for passing output signals from the first inverter gates I11, I12 and I13, according to a first select signal obtained by inverting the control signal of the start drive control circuit 300 through the inverter gate I1, respectively, a plurality of second three-state buffers B21, B22 and B23 for passing output signals from the first inverter gates I11, I12 and I13, according to a second select signal obtained by inverting the first select signal through the inverting input buffer B2, respectively, and a plurality of second inverter gates I21, I22 and I23 for receiving output signals from the first three-state buffers B11, B12 and B13 and the second three-state buffers B21, B22 and B23 in common by phases and inverting them to output gate drive signals ga, g2 and g3 for respective phases.

In this drive signal selecting circuit 400 with the above construction, the first three-state buffers B11, B12 and B13 are turned on at the drive state of motor, so as to output normal gate drive signals. At the stop state of motor, the second three-state buffers B21, B22 and B23 are turned on, so that the drive signals from the position detecting circuit 100 are outputted as gate drive signals for different phases, so as to start the motor.

In accordance with the first embodiment shown in FIG. 6, when the motor can not be started at a specific position, clock signals are supplied as gate drive signals, in place of drive signals based on the position detection. After starting the motor, the drive signals based on the position detection is supplied as gate drive signals, so as to drive normally the motor. In accordance with the second embodiment shown in FIG. 8, when the motor can not be started, the drive signals based on the position detection is supplied as gate drive signals for different phases, so as to start the motor. After starting the motor, the drive signals based on the position detection are supplied as gate drive signals for corresponding phases, so as to drive normally the motor.

As apparent from the above description, the present invention eliminates a problem that a motor can not be started at a specific position by drive signals based on the position detection, since the drive signals have low driving torque. Accordingly, there is no limitation on phase advance angle and conduction angle in designing motors. It is also possible to design motors with higher speed and improved efficiency.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A start assisting device for a high speed reluctance motor comprising:
   position detecting means for detecting the position of a rotor and generating drive signals for respective phases;
   stop discriminating means for scanning at least one of the phase drive signals and discriminating whether the motor is at its drive state or its stop state;
   start drive signal generating means for outputting a clock signal with a predetermined frequency generated from a clock generator as start drive signals for respective phases;
   drive signal selecting means for logically combining the start drive signals with the phase drive signals from the position detecting means, by phases, based on a control signal from the stop discriminating means, so as to select the start drive signals upon starting the motor and to select the drive signals from the position detecting means after starting the motor, and outputting the selected drive signals as gate drive signals for respective phases; and
   driving means for conducting coils for respective phases according to the gate drive signals from the drive signal selecting means.

2. A start assisting device in accordance with claim 1, wherein the stop discriminating means comprises a plurality of one-shot signal generators adapted to be triggered by the drive signals from the position detecting means and generate pulse signals which are maintained for a predetermined time, and a logic gate for logically combining output signals from the one-shot signal generators and generate different logic signals at the stop state of the motor and at the drive state of the motor.

3. A start assisting device in accordance with claim 1, wherein the start drive signal generating means comprises:
   the clock generator for generating a clock signal with a predetermined frequency;

a front flip-flops having a clock terminal for receiving an output signal from the clock generator;

a rear flip-flop having a clock terminal for receiving the output signal from the clock generator and adapted to receive a non-inverted output signal and an inverted output signal from the clock generator as a J input signal and a K input signal, respectively, feed back its inverted output signal as a J input signal of the from flip-flop and output a non-inverting output signal as a start drive signal of the third phase;

an AND gate for AND-combining the inverted output signals from the front and rear flip-flops and output the resultant signal as the start drive signal for the first phase; and another AND gate for AND-combining the inverted output signals from the front flip-flop and the non-inverted output signal from the rear flip-flop and output the resultant signal as the start drive signal for the second phase.

4. A start assisting device in accordance with claim 1, wherein the drive signal selecting means comprises:

a plurality of first AND gates for AND-combining a first select signal obtained by inverting the control signal from the stop discriminating means through an inverter gate with the drive signals from the position detecting means, respectively;

a plurality of second AND gates for AND-combining a second select signal obtained by buffering the inverted first select signal from the inverter gate through a buffer with the drive signals from the start drive signal generating means; and a plurality of OR gates for OR-combining output signals from respective of pairs of the first and second AND gates by phases and outputting gate drive signals for respective phases.

5. A start assisting device in accordance with claim 1, wherein the drive signal selecting means comprises:

a plurality of first inverter gates for inverting the phase drive signals outputted from the position detecting means and the start drive signals outputted from the start drive signal generating means, respectively;

a plurality of first three-state buffers for passing the phase drive signals from the position detecting means through the first inverter gates, according to a first select signal obtained by inverting the control signal of the stop discriminating means, respectively;

a plurality of second three-state buffers for passing the phase drive signals from the start drive signal generating means through the first inverter gates, according to a second select signal obtained by inverting the first select signal, respectively; and a plurality of second inverter gates for receiving output signals from the first three-state buffers and the second three-state buffers in common by phases and inverting them to output gate drive signals for respective phases.

6. A start assisting device for a high speed reluctance motor comprising:

position detecting means for detecting the position of a rotor and generating drive signals for respective phases;

stop discriminating means for scanning at least one of the phase drive signals and discriminating whether the motor is at its drive state or its stop state;

start drive control means for outputting a clock signal of a predetermined frequency generated from a clock generator as start control signal at the stop state of motor, according to a control signal from the stop discriminating means;

drive signal selecting means for selecting the phase drive signals from the position detecting means as gate drive signals for different phases and outputting them at the stop state of motor and selecting the phase drive signals from the position detecting means as gate drive signals for corresponding phases and outputting them at the drive state of motor; and driving means for exciting coils for respective phases according to the gate drive signals from the drive signal selecting means and driving the motor.

7. A start assisting device in accordance with claim 6, wherein the stop discriminating means comprises:

two one-shot signal generators adapted to be triggered by the drive signals for two phases from the position detecting means and generate stabilizing signals for a predetermined time constant; and an OR gate for ORing non-inverted output signals from the one-shot signal generators.

8. A start assisting device in accordance with claim 6, wherein the start drive signal generating means comprises:

the clock generator for generating a clock signal with a predetermined frequency; and an OR gate for ORing an output signal from the clock generator and an output signal from the stop discriminating means.

9. A start assisting device in accordance with claim 6, wherein the drive signal selecting means comprises a plurality of first AND gates for AND-combining a first control signal obtained by inverting the output signal from the stop discriminating means through an inverter gate with the drive signals for phases (c–c', a–a' and b–b') from the position detecting means, respectively;

a plurality of second AND gates for AND-combining a second control signal obtained by buffering the inverted first control signal from the inverter gate through an inverting input buffer with drive signals for phases (a–a', b–b' and c–c') from the start drive signal generating means, respectively; and a plurality of OR gates for ORing output signals from respective of pairs of the first and second AND gates and outputting gate drive signals.

10. A start assisting device in accordance with claim 6, wherein the drive signal selecting circuit comprises:

a plurality of first inverter gates for inverting the phase drive signals outputted from the position detecting circuit, respectively;

a plurality of first three-state buffers for passing output signals from the first inverter gates, according to a first select signal obtained by inverting the control signal of the start drive control circuit through the inverter gate, respectively;

a plurality of second three-state buffers for passing output signals from the first inverter gates, according to a second select signal obtained by inverting the first select signal through the inverting input buffer, respectively; and a plurality of second inverter gates for receiving output signals from the first three-state buffers and the second three-state buffers in common by phases and inverting them to output gate drive signals for respective phases.

* * * * *